(12) United States Patent
Dubois et al.

(10) Patent No.: US 9,446,549 B2
(45) Date of Patent: Sep. 20, 2016

(54) PROCESS FOR MANUFACTURING A RUBBER STRIP FOR A TIRE, COMPRISING WATER-COOLING MEANS

(75) Inventors: Vincent Dubois, Clermont-Ferrand (FR); François Ros, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 816 days.

(21) Appl. No.: 13/697,790

(22) PCT Filed: May 6, 2011

(86) PCT No.: PCT/FR2011/051034
§ 371 (c)(1),
(2), (4) Date: May 9, 2013

(87) PCT Pub. No.: WO2011/141668
PCT Pub. Date: Nov. 17, 2011

(65) Prior Publication Data
US 2013/0277880 A1    Oct. 24, 2013

(30) Foreign Application Priority Data
May 11, 2010    (FR) .................... 10 53661

(51) Int. Cl.
*B29C 47/88* (2006.01)
*B29C 47/00* (2006.01)
*B29D 30/52* (2006.01)
*B29C 35/00* (2006.01)
*B29C 35/16* (2006.01)

(52) U.S. Cl.
CPC ............... *B29C 47/88* (2013.01); *B29C 35/00* (2013.01); *B29C 47/0019* (2013.01); *B29C 47/884* (2013.01); *B29D 30/52* (2013.01); *B29C 47/8805* (2013.01); *B29C 47/8815* (2013.01); *B29C 2035/1616* (2013.01)

(58) Field of Classification Search
CPC .......... B29C 47/8805; B29C 47/8815; B29C 2035/1616
USPC ....... 264/169, 178 R, 211.13, 211.18, 211.2; 425/68
See application file for complete search history.

(56) References Cited

U.S. PATENT DOCUMENTS

| | | | |
|---|---|---|---|
| 1,682,876 A | 9/1928 | Weisse | |
| 4,247,506 A | 1/1981 | Summers | |
| 4,696,779 A | 9/1987 | Wideman | |
| 5,326,508 A | 7/1994 | Kaefer et al. | |
| 2002/0020936 A1* | 2/2002 | Toney | B29C 47/0021 264/177.19 |
| 2009/0160078 A1* | 6/2009 | Abad | B29C 47/0021 264/178 R |

FOREIGN PATENT DOCUMENTS

| | | |
|---|---|---|
| CN | 1333715 | 1/2002 |
| CN | 201179717 | 1/2009 |
| EP | 1 815 961 | 8/2007 |
| WO | WO 02/068169 | 9/2002 |

* cited by examiner

*Primary Examiner* — Alison L Hindenlang
*Assistant Examiner* — Lawrence D Hohenbrink, Jr.
(74) *Attorney, Agent, or Firm* — Cozen O'Connor

(57) ABSTRACT

In the method of manufacturing a strip (8) of rubber for vehicle tires: a strip (8) of rubber is formed; the strip is cooled with water; residual water (40) on the surface of the strip is heated from the exterior of the strip and/or this water is replaced by hotter water; and the water present on the surface of the strip is eliminated.

14 Claims, 1 Drawing Sheet

US 9,446,549 B2

PROCESS FOR MANUFACTURING A RUBBER STRIP FOR A TIRE, COMPRISING WATER-COOLING MEANS

RELATED APPLICATIONS

This is a U.S. National Phase Application under 35 USC 371 of International Application PCT/FR2011/051034 filed on May 6, 2011.

This application claims the priority of French application no. 10/53661 filed May 11, 2010, the entire content of which is hereby incorporated by reference.

FIELD OF THE INVENTION

The invention concerns the manufacture of vehicle tires.

BACKGROUND OF THE INVENTION

It is known to shape a strip of rubber for the manufacture of a vehicle tire by means of an extrusion operation. The temperature of the rubber on leaving the extruder is approximately 140° C. The mixture constituting the rubber notably includes products favouring the vulcanization of the elastomer, which vulcanization will take place later at high temperature. It is thus necessary to cool the strip on leaving the extruder without delay in order not to compromise the thermal life of the material.

The rubber is cooled by spraying it with water, for example. The core of the strip takes longer to cool than its surface, however. If the water deposited in this way evaporates, it leaves on the surface of the strip mineral salts that run the risk of degrading the properties of adhesion of the rubber to itself during subsequent operations of assembling strips of rubber to form the raw blank of the tire. This is the reason why the cooling water is driven off at a distance from the strip of rubber by means of nozzles blowing hot air that evacuate the water from the lower and upper surfaces of the strip without causing it to evaporate.

It is moreover desirable to increase the productivity of rubber extrusion lines, which implies accelerating the movement of the strip of rubber on the production line and in particular in the cooler. At higher speeds it is more difficult to evacuate the cooling water from the surface of the strip. It is equally difficult to evacuate all the water if the strip has a striated surface.

SUMMARY OF THE INVENTION

An object of the invention is to improve the elimination of water from the surface of the strip of rubber, notably on the hypothesis that the requirement is to increase the productivity of the extrusion line.

To this end there is provided in accordance with one aspect of the invention a method of manufacturing a strip of rubber for vehicle tires, in which:
a strip of rubber is formed;
the strip is cooled with cold water;
residual water on the surface of the strip is heated from the exterior of the strip and/or this water is replaced by hotter water; and
the water present on the surface of the strip is eliminated.

Accordingly, thanks to the heating and/or replacement step, the surface tension of the water deposited on the surface of the strip is reduced and the drops of water slide more easily over the surface of the product to drain them toward the exterior of the strip. In this regard, it should be remembered that the surface tension of water at 20° in contact with air is $73.10^{-3}$ N.m$^{-1}$. If the water is at 50°, its surface tension in contact with air is $68.10^{-3}$ N.m$^{-1}$. If the water is at 100°, its surface tension in contact with air is $59.10^{-3}$ N.m$^{-1}$. This tension is therefore reduced as the temperature of the water increases. Its flow over the surface of the product is thus facilitated. The water may then be evacuated more efficiently, even in the presence of striations, or the speed of movement of the strip may be increased without compromising the evacuation of the water.

Some of the cooling water is advantageously driven off at a distance from the strip after cooling and before the heating and/or replacement step.

This eliminates the cold water present on the surface of the strip and reduces the quantity of energy necessary for heating the water remaining on the strip or the water used by the replacement means located downstream.

In one embodiment, the strip passes through a water bath at a temperature between 45 and 65° C., preferably between 50 and 60° C., during the heating and/or replacement step.

The water on the surface of the strip is therefore at a temperature compatible with the subsequent thermal life of the material.

In another embodiment hot water is sprayed onto the strip during the heating and/or replacement step.

In another embodiment steam is sprayed onto the strip during the heating and/or replacement step.

At least some of the water is preferably driven off at a distance from the strip during the water elimination step. Here "driven off" refers to using given means to force the circulation of the water or the droplets of water toward the exterior of the surface of the strip.

The water elimination step is advantageously completed by causing evaporation of the traces of water still remaining on the surface of the strip.

It will be observed here that, the more efficacious the means for driving off the water, the lower the quantity of residual water that will have to be eliminated by evaporation, and consequently the deposits of mineral salts on the surface of the strip are reduced.

At least one of the driving off and evaporation steps, and preferably all of them, is advantageously effected by blowing air onto the strip.

Another aspect of the invention provides an installation for manufacturing a strip of rubber for vehicle tires, which includes:
means for forming a strip of rubber;
a water cooler adapted to cool the strip;
means for heating the water on the surface of the strip and/or means for replacing this water with hotter water; and
means for eliminating the water.

DETAILED DESCRIPTION OF THE INVENTION

Figure 1:
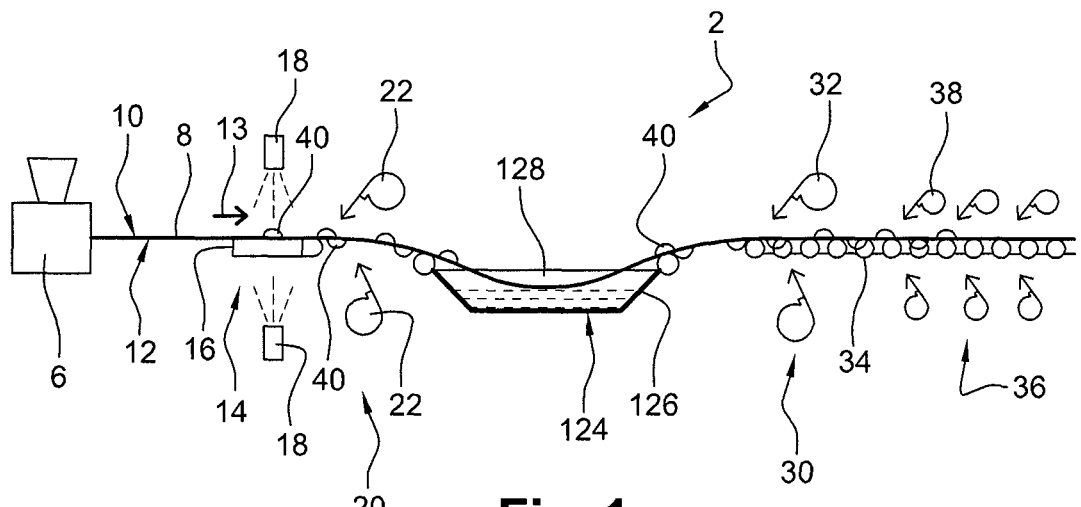
FIG. 1 is a diagrammatic view of an installation for manufacturing a strip of rubber using a first embodiment of the method of the invention.
Figure 4:
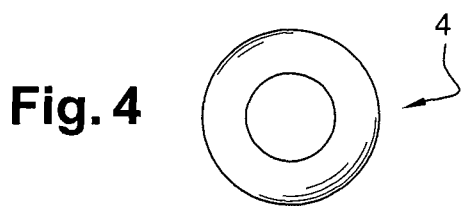
FIG. 4 is a view of a tire manufactured with the FIG. 1 installation.

There is shown in FIG. 1 an installation conforming to a first embodiment of the invention. The installation 2 is used for the manufacture of strips of rubber intended to form part of a raw tire blank with a view to the production of a tire 4 such as that shown in FIG. 4. The strip includes a mixture of elastomers and other products and is for example intended to form a tread of the tire. The tires are notably intended for wheels of vehicles of lightweight, heavy goods vehicle or earth moving type.

The installation 2 includes an extruder 6 adapted to form a strip 8 of rubber leaving the extruder via an orifice. The strip has a profiled shape of substantially rectangular cross section, the two larger faces of the strip, namely the upper face 10 and the lower face 12, being plane, horizontal and parallel to each other.

The various stations of the installation 2 are described hereinafter in the order in which the strip 8 passes through them and with reference to the direction 13 of movement of the strip.

The installation includes a cooler 14 including a belt adapted to support the moving strip, and, facing each face 10, 12 of the strip, one or more nozzles 18 for spraying the surface of the strip with cold water.

The installation then includes a pre-drying station 20 including, facing each face of the strip, one or more nozzles 22 for blowing air disposed in series one after the other in the direction 13 of movement. The function of the nozzles is to drive off at least some of the residual cooling water 40 on the surface of the strip on both its faces 10, 12.

The installation then includes a cooling water heating station 124. In this embodiment, the station 124 includes a bath formed by a tank 126 containing heating water 128 at a temperature between 45 and 65° C., for example between 50 and 60° C. Here the temperature is 55° C. The bath is arranged on the path of movement of the strip. This bath is maintained at this temperature by appropriate thermostatically-controlled heating or cooling means.

The installation then includes a station 30 for drying the strip, including, facing each face 10, 12, one or more nozzles 32 for blowing air disposed in series one after the other in the direction 13 of movement. The station further includes a table 34 for supporting the moving strip. The function of the station 30 is to drive off some or all of the residual water from the bath on the two faces of the strip to commence drying it.

The installation then includes an evaporation station 36 also including, facing each face of the strip, one or more nozzles 38 disposed in series one after the other in the direction 13 of movement and blowing air, preferably hot air, onto each of the two faces of the strip. The station 36 also includes a roller table for supporting the moving strip which here is shared with the station 34. The object of the station 36 is to dry by evaporation the residual traces of water on the faces of the strip, in particular in its striations where applicable.

The method of the invention is implemented by means of this installation in the following manner.

The strip of rubber leaves the extruder 6. It enters the cooler 14 where its two faces are sprayed with cold water, which leads to the presence of drops 40 of water thereon.

Some of this water is driven off at the pre-drying station 20 but water may remain on each of the faces. The function of the station 20 is to drive off the major part of the water on the strip in order that it does not cool the water in the bath of the next station too much.

The strip then enters the bath 28, on leaving which the surface of the strip carries drops 40 of water at a temperature higher than the drops of water that it was carrying before entering the bath.

The strip then goes to the pre-drying station 30 where a major part of the hot water on it is driven off.

It then goes to the station 36 where the step of elimination of water from the surface of the strip is completed by evaporation of the residual drops of water.

Thanks to the station 124, the water present on the product at the moment of its arrival at the water elimination stations 30 and 36 is hotter than at the exit from the cooling station 14. Because of this, its surface tension is reduced and its flow over the product because of the effect of the nozzle 32 is facilitated. In other words, the cold water from the cooler present on the product is replaced by hotter water which is therefore easier to drive off. Here the nozzles 22 of the station 20 and the nozzles 32 of the station 30 use a higher air flow rate than those 38 of the station 36 and/or a lower pressure than the latter.

Figure 2:
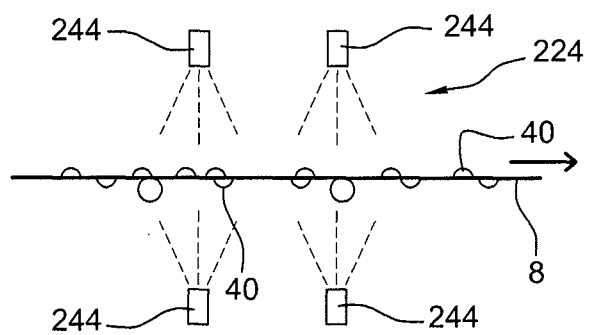
FIGS. 2 and 3 are partial views analogous to FIG. 1 showing two other embodiments of the installation and the method.

There is shown in FIG. 2 a second embodiment of the installation in which the heating station with its bath is replaced by a station 224 including on each side of the strip one or more nozzles 244 adapted to spray with hot water the two faces of the moving strip in order to replace the water initially on the surface of the strip with hotter water or to add hotter water to this surface. Here the nozzles are disposed in series one after the other in the direction 13 of movement, facing each face of the strip.

Figure 3:
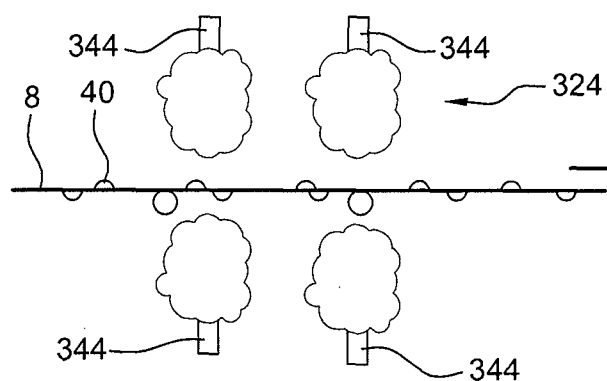

In a third embodiment shown in FIG. 3, the heating station with its bath is replaced this time by a station 324 that includes one or more nozzles 344 adapted to direct steam onto each of the faces of the moving strip in order, likewise, to replace the residual water thereon with hotter water or to heat that water. Here the nozzles are again disposed in series one after the other in the direction 13 of movement, facing each face of the strip.

In all cases, before the final elimination of the residual water present on its surface, the product carries on its surface water hotter than on leaving the cooling station, without raising the temperature of the product itself too much.

Of course, numerous modifications could be made to the invention without departing from its scope.

The cooling station 14 could comprise a cooling water bath through which the strip passes.

The invention claimed is:

1. Method of manufacturing a strip of rubber for vehicle tires, comprising the steps of:
    forming a strip of rubber including a vulcanization agent;
    cooling said strip with water;
    heating residual water on the surface of the strip from the exterior of the strip and/or replacing this water by hotter water; and
    eliminating the water present on the surface of the strip.

2. The method according to claim 1, wherein some of the cooling water is driven off at a distance from the strip after cooling and before the heating and/or replacement step.

3. The method according to claim 2, wherein at least one of the driving off and elimination steps, is effected by blowing air onto the strip.

4. The method according to claim 2,
    wherein the water elimination step is completed by causing evaporation of the traces of water still remaining on the surface of the strip; and
    wherein all of the driving off and evaporation steps are effected by blowing air onto the strip.

5. The method according to claim 1, wherein the strip is caused to circulate in a hot water bath during the heating and/or replacement step.

6. The method according to claim 5, wherein the water from the bath has a temperature between 45 and 65° C.

7. The method according to claim 5, wherein the water from the bath has a temperature between 50 and 60° C.

8. The method according to claim 1, wherein hot water is sprayed onto the strip during the heating and/or replacement step.

9. The method according to claim 8, wherein the water sprayed onto the strip has a temperature between 45 and 65° C.

10. The method according to claim 8, wherein the water sprayed onto the strip has a temperature between 50 and 60° C.

11. The method according to claim 1, wherein steam is sprayed onto the strip during the heating and/or replacement step.

12. The method according to claim 1, wherein at least some of the water is driven off at a distance from the strip during the water elimination step.

13. The method according to claim 1, wherein the water elimination step is completed by causing evaporation of the traces of water still remaining on the surface of the strip.

14. The method according to claim 1, wherein deposits of mineral salts on the surface of the strip are reduced.

* * * * *